(12) United States Patent
Huang et al.

(10) Patent No.: US 8,131,966 B2
(45) Date of Patent: Mar. 6, 2012

(54) SYSTEM AND METHOD FOR STORAGE STRUCTURE REORGANIZATION

(75) Inventors: Jian J. Huang, Beijing (CN); Zhe Xiang, Beijing (CN); Velnambi Yogalingam, San Jose, CA (US); Kai Gee Hoong Young, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 11/742,396

(22) Filed: Apr. 30, 2007

(65) Prior Publication Data
US 2008/0270742 A1    Oct. 30, 2008

(51) Int. Cl.
*G06F 12/02* (2006.01)
(52) U.S. Cl. .................. 711/165; 711/E12.002
(58) Field of Classification Search .............. 711/165, 711/E12.002
See application file for complete search history.

(56) References Cited

U.S. PATENT DOCUMENTS

| | | | | |
|---|---|---|---|---|
| 5,761,536 | A | 6/1998 | Franaszek | 395/888 |
| 6,636,879 | B1 | 10/2003 | Doucette et al. | 707/205 |
| 7,051,055 | B1 * | 5/2006 | Schneider | 707/206 |
| 7,096,227 | B2 | 8/2006 | Murray et al. | 707/100 |
| 7,124,272 | B1 * | 10/2006 | Kennedy et al. | 711/173 |
| 2005/0210218 | A1 * | 9/2005 | Hoogterp | 711/203 |
| 2006/0149899 | A1 * | 7/2006 | Zimmer et al. | 711/112 |

OTHER PUBLICATIONS

Bhadkamkar et al., "BORG: Block-reORGanization and Self-optimization in Storage Systems," USENIX Conference on File and Storage Structure Technologies, Syracuse University, Jan. 1, 2007, pp. 183-196.*
Akyurek et al., "Adaptive Block Rearrangement," ACM Transactions on Computer Systems, vol. 13, No. 2, May 1995, pp. 89-121.*
Rummler et al., "Disk Shuffling," Hewlett-Packard Company, 1991, pp. 1-9 (including title page).*
"An Implementation of Power-aware Storage Architecture," Tianzhou Chen et al., 2006.
"Data Remapping for Design Space Optimization of Embedded Memory Systems", Rodric M. Rabbah et al. Georgia Institute of Technology, Atlanta, 2003.
"Hash-based Labeling Techniques for Storage Scaling," Shu-Yuen D. Yao et al. The VLDB Journal (2005) 14:222-237.
"Memory Data Organization for Improved Cache Performance in Embedded Processor Applications," Preeti Ranjan Panda et al. University of California at Irvine, 1997.

* cited by examiner

*Primary Examiner* — Shane M Thomas
(74) *Attorney, Agent, or Firm* — Kunzler Needham Massey & Thorpe (57) ABSTRACT

A method and system to reorganize a storage structure by generating correlation data that represents relationships between storage blocks of a storage structure, generating a block allocation scheme for the storage structure, determining a block reorganization operation, performing the block reorganization operation, and updating a virtual map. In certain embodiments, the system may include multiple host computers, a data storage subsystem, and multiple storage structures. The storage structures may include a hard disk, an array of hard disks, an IBM TotalStorage™ system, and a hierarchical storage system with RAID.

22 Claims, 5 Drawing Sheets

SYSTEM AND METHOD FOR STORAGE STRUCTURE REORGANIZATION

BACKGROUND OF THE INVENTION

1. Field of the Invention

This invention relates to data storage systems and methods and more particularly to systems and methods for reorganizing storage structures.

2. Description of the Related Art

High performance storage systems have become more and more important in the current business world. Storage system performance is often determined by its hardware and architecture. However, storage system performance is also affected by the cumulative application behaviors of hosts.

For example, if a file system frequently undergoes add/edit/delete operations, newly added files are often broken into multiple discontinuous blocks on the storage structure. A storage structure includes the data storage media and the physical or logical organization of the data storage media. Examples include a single hard disk, an array of hard disks, an IBM TotalStorage™ system, and a hierarchal storage system with RAID. When a file is read, the storage controller has to scan multiple locations on the storage media which increases the storage seek-time-one of the most significant bottlenecks in a computer's performance.

Currently, certain file defragmentation utilities exist, such as Microsoft Defragment Tools, Norton Utilities and Mac Defragment Tools. However, currently available file defragmentation utilities have certain shortcomings. Firstly, file defragmentation utilities typically consume considerable host resources. Indeed, defragmentation is often so cumbersome that the host has to stop running other applications altogether to allow the file defragmentation utility to operate properly. Secondly, file defragmentation utilities typically run in the operating system (OS) of a host computer. As such, for each operating system and file systems, the host has to implement a different version of the file defragmentation utility.

Thirdly, file defragmentation operations do not know the architecture of the media storage structure in detail and typically treat low level storage as a single media and assume that linear data allocation will achieve good performance. In particular, OS-based defragmentation utilities are typically unaware of the architecture of enterprise-level storage systems such as hierarchical storage systems with RAID and virtual mapping capabilities. Finally, such file defragmentation utilities only consider the block continuity of individual files and ignore other kinds of block correlations.

SUMMARY OF THE INVENTION

The present invention has been developed in response to the present state of the art, and in particular, in response to the problems and needs in the art that have not yet been fully solved by currently available media defragmentation means and methods. Accordingly, the present invention has been developed to provide a computer program product, apparatus, system, and method for reorganizing a storage structure.

In one aspect of one version of the present invention, an enhanced system for reorganizing a storage structure includes one or more host computers that communicate input/output (I/O) commands, one or more storage structures capable of storing storage blocks, and one or more data storage subsystems. The storage subsystem uses I/O data describing I/O operations performed by the storage subsystem and a least one correlation algorithm to generate correlation data representing relationships between the storage blocks of the storage structure. The storage subsystem also generates one or more block allocation schemes based on storage structure metadata and the allocation schemes. An allocation scheme may include a rule for organizing storage blocks within the storage structure.

The storage subsystem also determines a block reorganization operation based on the correlation data, the allocation schemes, and one or more reorganization algorithms. The storage subsystem may also perform the block reorganization operation and update a virtual map to reflect performance of the block reorganization operation. The virtual map correlates a host storage address space with the storage blocks of the storage structure.

In another aspect of one version of the present invention an apparatus for reorganizing a storage structure includes a correlation module that uses I/O data describing I/O operations and at least one correlation algorithm to generate correlation data representing relationships between storage blocks of a storage structure. The correlation data may be stored in a correlation data repository. The apparatus may also include an allocation scheme module that generates at least one block allocation scheme based on storage structure metadata. A block allocation scheme may include a rule for organizing storage blocks within the storage structure.

The apparatus may also include a reorganization module that determines a block reorganization operation based on the correlation data, the allocation schemes, and one or more reorganization algorithms. A block reorganization operation may facilitate reorganization of storage blocks on the storage structure. The reorganization module may also perform the block reorganization operation on the storage structure to maximize data throughput. The apparatus may also include updating a virtual map to reflect the block reorganization operation. A virtual map may correlate a host storage address space with the storage blocks of the storage structure.

In some embodiments, the correlation data module also monitors the I/O commands of multiple host computers and generates the I/O data describing the I/O operations performed by the storage subsystem. In one embodiment, the I/O data includes read/write data, logical unit identification data, logical block address data, block count data, etc. In some embodiments, the allocation scheme module stores the block allocation schemes in an allocation scheme repository. In certain embodiments, a storage structure may include a hard disk, an array of hard disks, an IBM TotalStorage™ system, or a hierarchical storage system with RAID. In some embodiments, storage structure metadata includes device information (such as architecture information) and conformation information corresponding to the storage structure. Conformation information may include information regarding substructures within the storage structure such as RAID0, RAID1, RAID5, RAID50, etc. Conformation information may include information describing the physical and logical attributes of the storage structure such as the number of hard disks, the storage capacity of the hard disks, the physical location of storage space on each hard disk, and the like.

In another aspect of one version of the present invention a method for reorganizing a storage structure includes the operations of generating correlation data representing relationships between storage blocks of a storage structure, the correlation data based on I/O data describing I/O operations and at least one correlation algorithm. The method also includes generating one or more block allocation schemes based on storage structure metadata. A block allocation scheme may include a rule for organizing storage blocks within the storage structure.

The method may also include the operation of determining a block reorganization operation based on the correlation data, the allocation schemes, and one or more reorganization algorithms. A block reorganization operation may facilitate reorganizing the storage blocks of the storage structure in such a manner so as to minimize data access times. The method also includes performing the block reallocation operation and updating a virtual map to reflect the block reorganization operation. A virtual map may correlate a host storage address space with the storage blocks of the storage structure Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages will become more fully apparent from the following description and appended claims, or may be learned by the practice of the invention herein.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. The invention may also be embodied in a computer readable storage medium which provide a tangible object or device, such as a disk, on which data to enable the described functionality is stored.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code lines, among different programs, and across several memory devices. Similarly, operational data may be identified and illustrated herein within modules and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
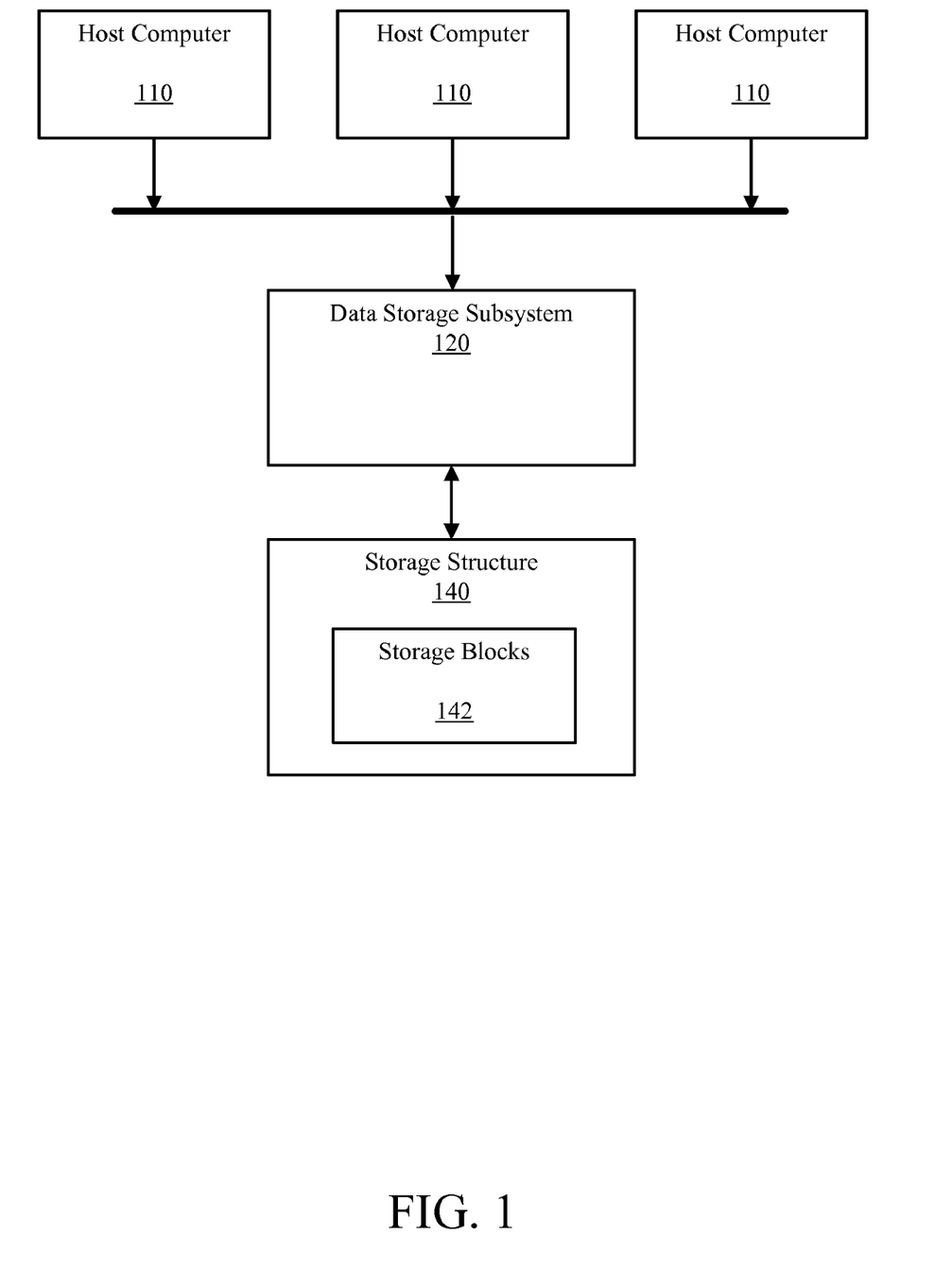
FIG. 1 is a block diagram illustrating one embodiment of a storage structure reorganization system in accordance with the present invention.

FIG. 1 is a block diagram illustrating one embodiment of a storage reorganization system 100 in accordance with the present invention. The depicted system 100 includes one or more host computers 110, a data storage subsystem 120, and a storage structure 140. In certain embodiments, the system 100 includes multiple storage structures 140. The components of the system 100 cooperate to reorganize the storage blocks 142 of the storage structure 140.

The data storage subsystem 120 may monitor input/output (I/O) commands of the host computers and generate I/O data describing the I/O operations performed by the subsystem 120. The I/O data may be used by the data storage subsystem 120, along with one or more correlation algorithms (which may be executed by a correlation module), to generate correlation data representing relationships between the storage blocks 142 within the storage structure 140. A storage block may include a block of data stored on the storage structure 140. The correlation data may be stored in a correlation data repository for later use. Determining the correlation between storage blocks 142 enables the data storage subsystem 120 to determine the frequency with which two or more storage blocks 142 are accessed in temporal proximity to one another.

The data storage subsystem 120 may examine the storage structure 140 to generate storage structure metadata which can include device architecture information and conformation information. Conformation information includes information describing physical and logical attributes of the storage structure. For example, conformation information may include information regarding whether the storage structure includes a single hard disk or an array of hard disks. Conformation information may also include information regarding the storage technique implemented such as RAID5. Conformation information may also include information regarding the sequence in which segments of storage space are accessed, the physical location of the segments of storage space, and the like.

The data storage subsystem 120 may use the storage structure metadata to generate one or more block allocation schemes for organizing data within the storage structure. The block allocation schemes may be stored in an allocation scheme repository for later use. Generating a block allocation scheme enables the data storage subsystem 120 to tailor a block reorganization operation to the particular constraints of an individual storage structure.

The data storage subsystem 120 may determine a block reorganization operation based on the correlation data, the allocations schemes, and one or more reorganization algorithms (which may be executed by a reorganization module). Examples of a reorganization algorithm may include an algorithm that intended to determine which storage blocks should be placed together based on a large correlation value. Such an operation, which reorganizes the order of storage blocks such that they are placed together, is a form of shuffling, rather than copying, the storage blocks. When executed, the reorganization operation may reduce the access time for storage blocks 142 on the storage structure 140. The data storage subsystem 120 may update a virtual map (see FIG. 2) to reflect the block reorganization operation. The virtual map may correlate a host storage address space with the storage blocks 142 of the storage structure 140. As such, the virtual map enables the data storage subsystem 120 to perform storage block reorganization operations without involving the host computer or altering the host storage address space.

Figure 2:
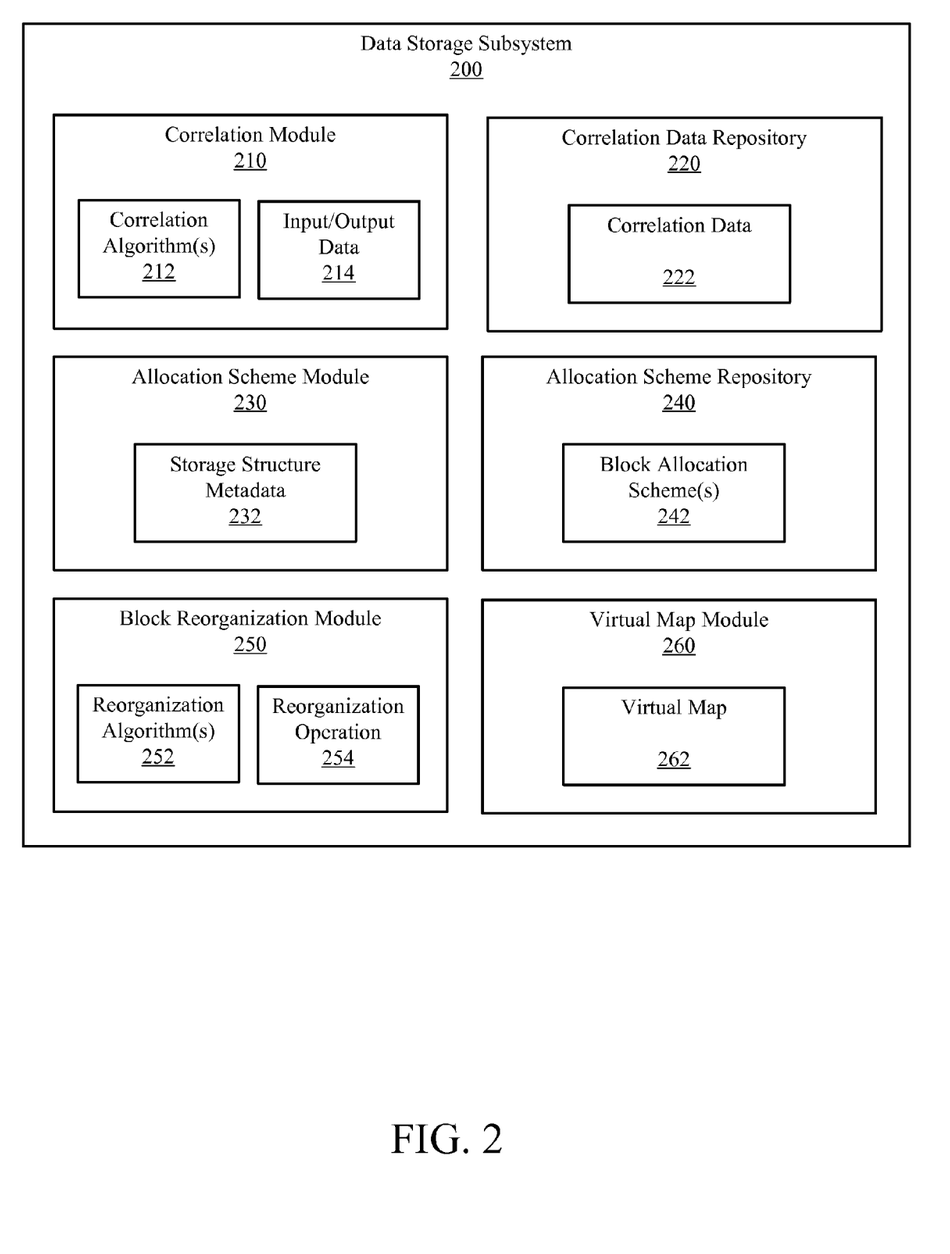
FIG. 2 is a block diagram illustrating one embodiment of a data storage subsystem in accordance with the present invention.

FIG. 2 is a block diagram illustrating one embodiment of a data storage subsystem 200 in accordance with the present invention. The depicted data storage subsystem 200 includes a correlation module 210, a correlation data repository 220, an allocation scheme module 230, an allocation scheme repository 240, a block reorganization module 250, and a virtual map module 260. The components of the data storage subsystem 200 cooperate to reorganize the data blocks of a storage structure.

The correlation module 210 uses I/O data 214 that describes I/O operations and at least one correlation algorithm 212 to generate correlation data 222 representing relationships between storage blocks of a storage structure. In certain embodiments, the correlation data module 210 monitors input/output (I/O) commands of one or more host computers and generates I/O data 214 corresponding to the I/O commands. In certain embodiments, the correlation module 210 stores the correlation data 222 in the correlation data repository 220. Determining relationships between storage blocks enables the data storage subsystem 200 to determine which storage blocks should be reorganized to a location more proximate to one another.

The allocation scheme module 230 generates one or more block allocation schemes 242 based on storage structure metadata 232. Storage structure metadata 232 may include a description of underlying physical structure of a storage device such as a single disk, disk array, storage area network, etc. A block allocation scheme may include a rule for organizing storage blocks within the storage structure. In certain embodiments, the allocation scheme module 230 examines the storage structure to generate the storage structure metadata 232 which may include device architecture and conformation information. In certain embodiments, the allocation scheme module 230 stores the block allocation schemes 242 in an allocation scheme repository 240. Generating block allocation schemes based upon storage structure metadata 232 enables the present invention to produce a block allocation scheme 242 particular to a storage structure. Examples of allocation schemes include sequential allocation schemes or read-optimized allocation schemes.

The block reorganization module 250 determines a block reorganization operation 254 based on the correlation data 222, the allocation schemes 242, and one or more reorganization algorithms 254. The block reorganization operation 252 may include instructions for reorganizing storage blocks on the storage structure to maximize data throughput. In certain embodiments, the block reorganization module 250 performs the block reorganization operation 252 on the storage structure. Enabling the data storage subsystem 200 to perform the reorganization operation 254 alleviates a host computer from having to allocate time and resources for performing the reorganization operation 254.

The virtual map module 260 updates a virtual map 262 to reflect the block reorganization operation 254. In certain embodiments, the virtual map 262 correlates a host storage address space with the storage blocks of the storage structure. Thus, though the storage blocks of the storage structure may have been reorganized via execution of the reorganization operation 254, from the host perspective, no change has taken place because the host storage address space remains unchanged.

Figure 3:
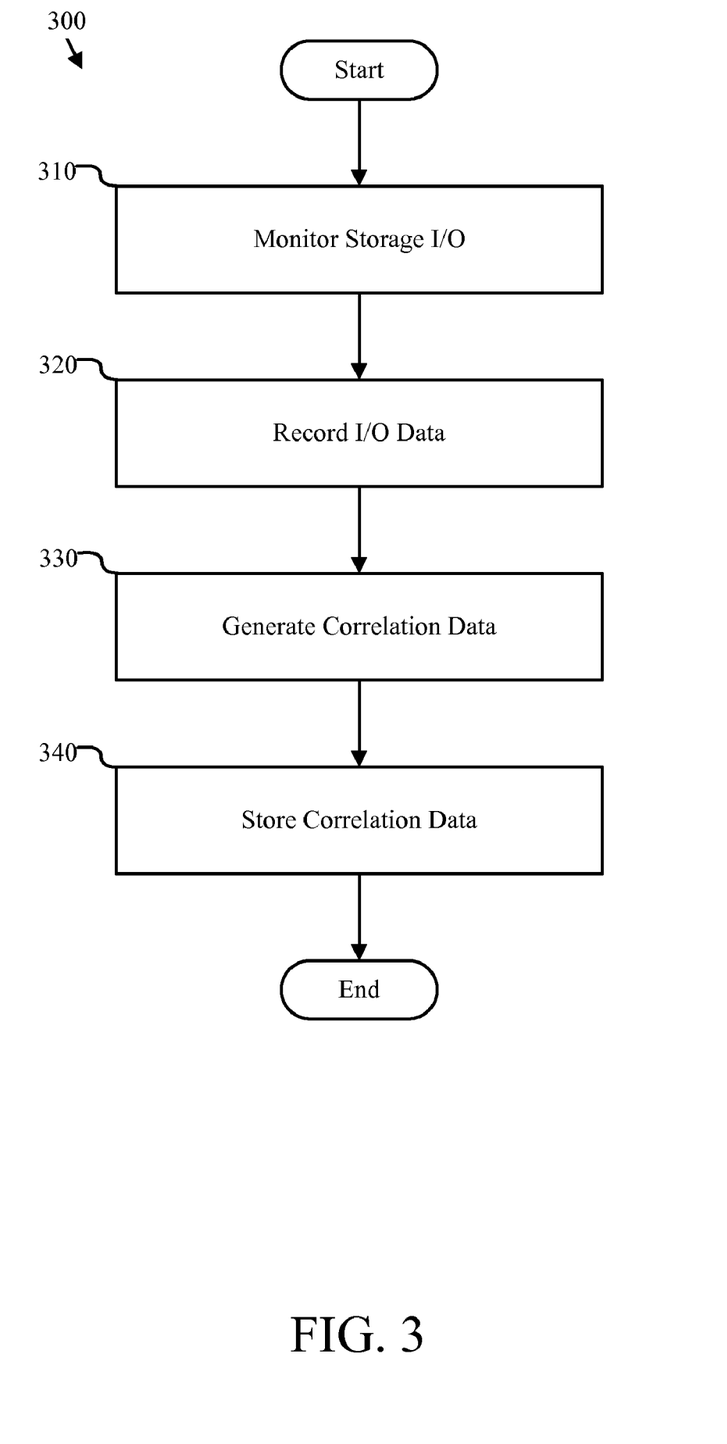
FIG. 3 is a schematic flow chart diagram illustrating one embodiment of a method for generating block correlation data in accordance with the present invention.

FIG. 3 is a schematic flow chart diagram illustrating one embodiment of a method 300 for generating block correlation data in accordance with the present invention. The depicted method 300 includes monitoring 310 storage I/O commands, recording 320 I/O data describing I/O operations, generating 330 correlation data, and storing 340 correlation data. The operations of the method 300 facilitate using block correlation data.

Monitoring 310 storage I/O commands may include a data storage subsystem monitoring the I/O commands between a host computer and a data storage subsystem. In certain embodiments, monitoring 310 may include monitoring storage I/O commands between multiple host computers and a data storage subsystem. Recording 320 I/O data may include recording information describing the I/O operations performed by a data storage subsystem. One of skill in the art will recognize that the I/O data recorded may include only the data useful to facilitate the storage block reorganization operations described herein. Examples of I/O data include read/write data, logical unit identification data, logical block address data, and block count data.

Generating 330 correlation data may include determining the storage blocks of a storage structure that relate to one another based on the I/O data and one or more correlation algorithms. An example of a correlation algorithm includes an algorithm that facilitates determining a correlation value between two blocks based upon the frequency with which the two blocks are read sequentially. For example, generating 330 may include procuring information that describes the frequency or probability with which two or more storage blocks are accessed within a given time frame. One skilled in the art will recognize that a correlation between two or more storage blocks may be defined by a large variety of constraints.

Additionally, one skilled in the art will realize that the present solution correlates storage blocks and is not bound by a filing system defined by the host (such as the host operating system). As such, the present solution enables the reorganization of storage blocks corresponding to a single file as well as storage blocks that are frequently accessed together, but actually correspond to different files. Storing 340 the correlation data may include storing the correlation data in a data repository for subsequent use.

Figure 4:
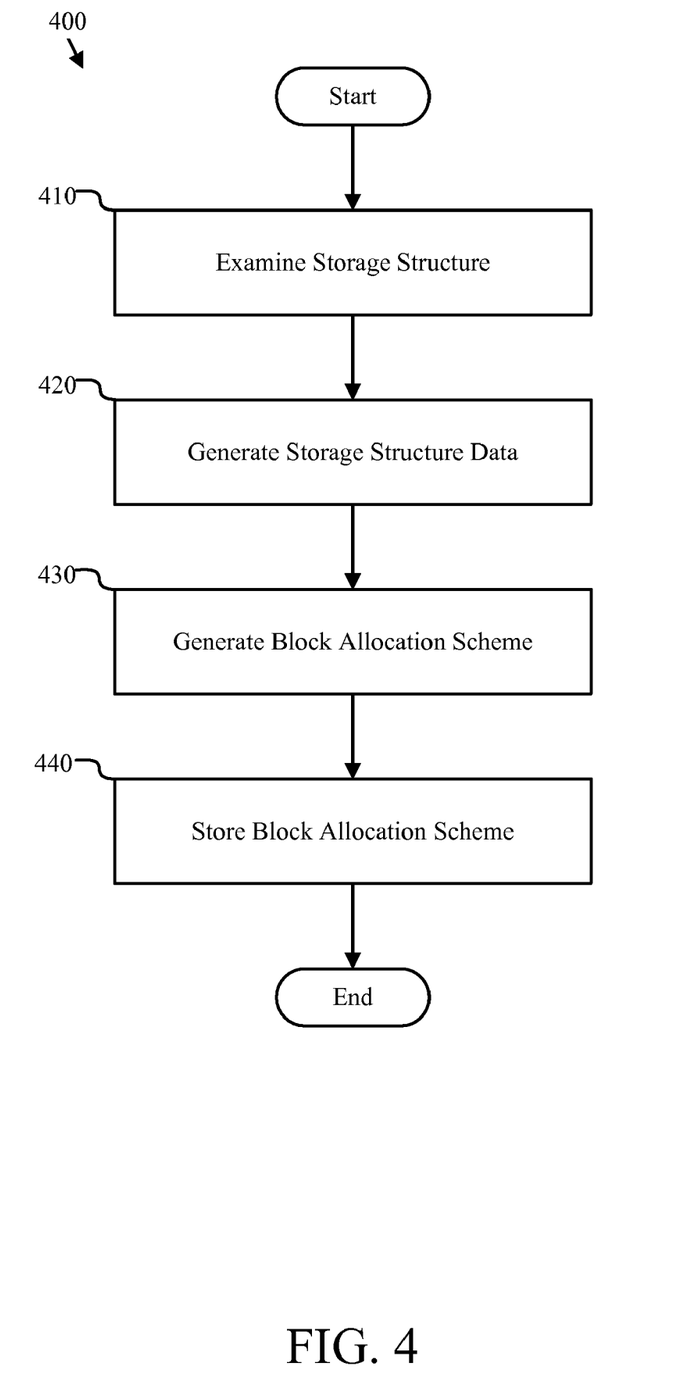
FIG. 4 is schematic flow chart diagram illustrating one embodiment of a method for generating an allocation scheme in accordance with the present invention.

FIG. 4 is schematic flow chart diagram illustrating one embodiment of a method for generating an allocation scheme in accordance with the present invention. The depicted method 400 includes the operations of examining 410 a storage structure, generating 420 storage structure metadata, generating 430 a block allocation scheme, and storing 440 the block allocation scheme. The operations of the method 400 facilitate the procurement of block allocation schemes for storage structure reorganization.

Examining 410 a storage structure may include examining a storage structure corresponding to the I/O commands of a host computer. The storage structure may be implemented with a variety of storage structures including a single hard disk, an array of hard disks, an IBM TotalStorage™ system, and a hierarchical storage system with RAID. Generating 420 storage structure metadata may include producing device and conformation information corresponding to the storage structure examined 410. For example, storage structure metadata may include information regarding a storage structure having multiple interlaced hard disks as opposed to a single, linear implementation. Examples of conformation information may include information regarding implementations using RAID0, RAID1, RAID5, RAID50, etc.

Generating 430 a block allocation scheme may include generating a specific allocation scheme for the specific storage structure examined. This may include, for example, a block allocation scheme tailored to optimize the storage block organization in a storage structure having multiple interlaced hard disks. As such, the present solution provides a reorganization approach that is customized to the constraints of the storage structure and is entirely independent from the software (such as the operating system) of the host computer. Storing 440 the block allocation scheme may include storing the block allocation scheme in an allocation repository for subsequent use.

Figure 5:
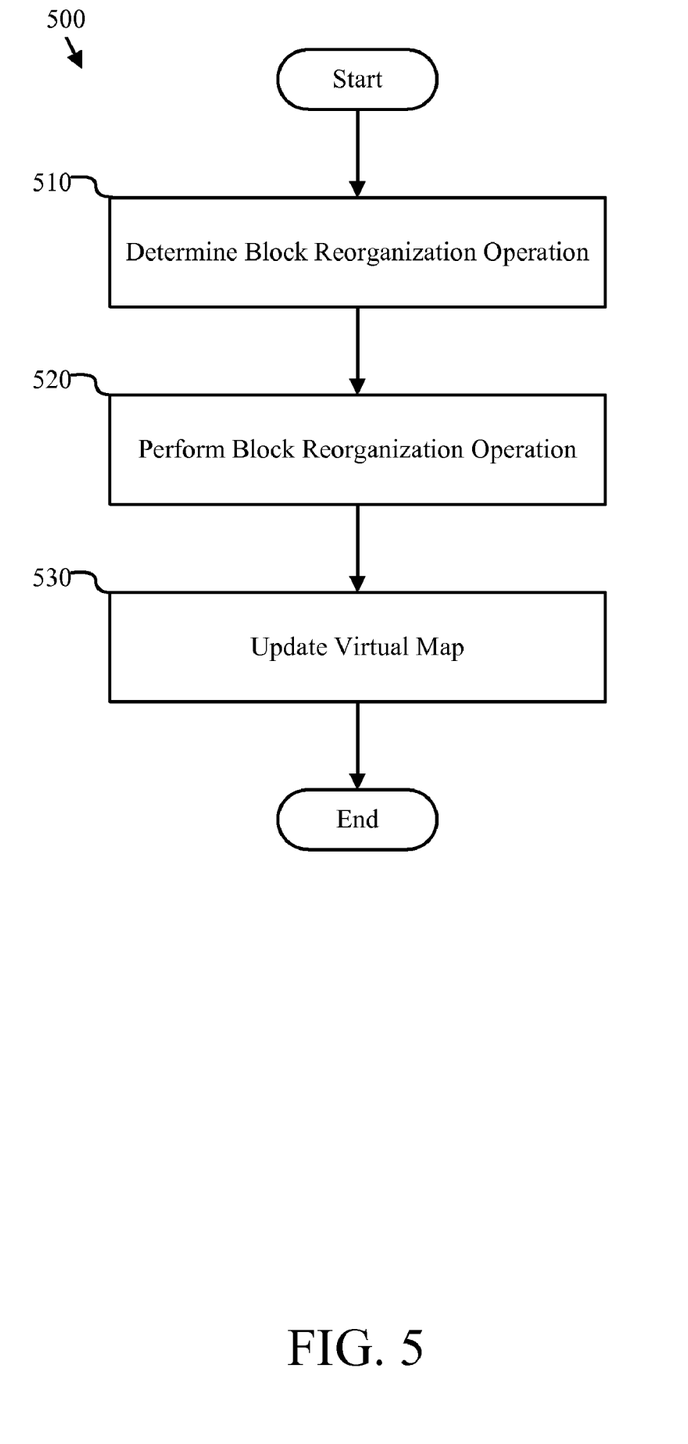
FIG. 5 is a schematic flow chart diagram illustrating one embodiment of a method for determining a block reorganization operation and updating a virtual map in accordance with the present invention.

FIG. 5 is a schematic flow chart diagram illustrating one embodiment of a method 500 for updating a storage structure in accordance with the present invention. The method 500 includes the operations of determining 510 a block reorganization operation, performing 520 the block reorganization operation, and 530 updating a virtual map. The operations of the method 500 provide an approach to implementing a data reorganization of a storage structure.

Determining 510 a block reorganization operation may include using correlation data, one or more block allocation schemes, and one or more reorganization algorithms. Performing 520 the block reorganization operation may include a data storage subsystem performing the block reorganization operation on a storage structure. When performed, the block reorganization operation enables storage structure reorganization according to the tailored and block-level solution described herein.

Updating 530 a virtual map may include updating a subsystem virtual map to reflect execution of the data reorganization operation. The virtual map may operate as an address intermediary between the host computer address space and the location of the storage blocks within the storage structure. For example, when the host intends to access one or more storage blocks, the host will reference the host address space and the storage subsystem may cross reference the host address space with the virtual map in order to locate the one or more data blocks the host intends to access. As such, because the virtual map may operate as a cross reference for storage blocks, the host computer need not be burdened by the reorganization process.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product stored on a computer readable storage medium for reorganizing a storage structure comprising instructions that, when executed on a data storage subsystem, causes:
   the data storage subsystem that is separate from a host implementing an operating system using the data storage subsystem to perform a block reorganization operation that shuffles one or more storage blocks of the storage structure based on correlation data representing relationships between individual storage blocks of the storage structure, a block allocation scheme describing physical and logical attributes of the storage structure, and at least one reorganization algorithm for storing correlated storage blocks in physical proximity to each other on the storage partition of the storage structure, wherein the block reorganization operation is performed by the data storage subsystem transparently to the operating system employing the data storage subsystem; and
   the data storage subsystem to update a virtual map to reflect the effects of the block reorganization operation, the virtual map configured to map a host storage address space of the operating system to the one or more storage blocks of the storage structure.

2. The computer program product of claim 1, further comprising instructions for monitoring input/output (I/O) commands of the host computer.

3. The computer program product of claim 2, further comprising instructions for recording I/O data describing I/O operations.

4. The computer program product of claim 3, wherein the I/O data describing the I/O operations is selected from the group consisting of access time, read/write data, access blocks, logical unit identification data, logical block address data, and block count data.

5. The computer program product of claim 1, further comprising instructions for storing the correlation data in a correlation data repository.

6. The computer program product of claim 1, further comprising instructions for generating storage structure metadata.

7. The computer program product of claim 1, further comprising instructions for storing the block allocation scheme in an allocation scheme repository.

8. The computer program product of claim 1, wherein the storage structure is selected from the group consisting of a hard disk, an array of hard disks, a total storage system, and a hierarchical storage system with redundant array of independent disks ("RAID").

9. The computer program product of claim 1, further configured to cause generating the correlation data representing relationships between individual storage blocks of the storage structure and a frequency with which the one or more storage blocks are accessed in temporal proximity to one another.

10. The computer program product of claim 1, further configured to cause generating the block allocation scheme based on storage structure metadata, the block allocation scheme comprising a rule for organizing the one or more storage blocks within the storage structure.

11. An apparatus for reorganizing storage blocks of a storage structure, the apparatus comprising:
 a reorganization module configured to perform a block reorganization operation that shuffles one or more storage blocks of the storage structure based on correlation data representing relationships between individual storage blocks of the storage structure, a block allocation scheme describing physical and logical attributes of the storage structure, and at least one reorganization algorithm for storing correlated storage blocks in physical proximity to each other on the storage partition of the storage structure, wherein the block reorganization operation is performed by the data storage subsystem transparently to an operating system employing the data storage subsystem;
 a virtual map module configured to update a virtual map to reflect the effects of the block reorganization operation, the virtual map configured to map a host storage address space of the operating system with the one or more storage blocks of the storage structure;
 wherein the reorganization module and the virtual map module comprise at least one of hardware circuits and instructions stored on a computer readable storage medium and are implemented on the data storage subsystem that is separate from a host implementing the operating system using the data storage subsystem.

12. The apparatus of claim 11, further comprising a correlation module configured to generate the correlation data representing relationships between individual storage blocks of a storage structure, the correlation data based on input/output (I/O) data describing I/O operations, wherein the correlation data module is further configured to monitor I/O commands of the host computer.

13. The apparatus of claim 12, wherein the correlation module is further configured to record the I/O data describing the I/O operations.

14. The apparatus of claim 13, wherein the correlation module is further configured to store the correlation data in a correlation data repository.

15. The apparatus of claim 11, further comprising an allocation scheme module configured to generate the block allocation scheme based on storage structure metadata, wherein at least one block allocation scheme comprises a rule for organizing the one or more storage blocks within the storage structure, wherein the allocation scheme module is further configured to examine the storage structure to generate storage structure metadata.

16. The apparatus of claim 15, wherein the allocation scheme module is further configured to store at least one block allocation scheme in an allocation scheme repository.

17. The apparatus of claim 15, wherein the storage structure metadata comprises device architecture information and conformation information corresponding to the storage structure.

18. The apparatus of claim 11, wherein the storage structure is selected from the group consisting of a hard disk, an array of hard disks, total storage system, and a hierarchical storage system with redundant array of independent disks ("RAID").

19. A system for reorganizing a storage structure, wherein the system comprises:
 at least one host computer implementing an operating system and configured to communicate input/output (I/O) commands;
 at least one storage structure configured to store storage blocks in one or more storage partitions;
 at least one data storage subsystem that is separate from the host computer using the at least one data storage subsystem, the data storage subsystem configured to:
  perform a block reorganization operation that shuffles one or more storage blocks of the at least one storage structure based on correlation data representing relationships between individual storage blocks of the at least one storage structure, a block allocation scheme describing physical and logical attributes of the at least one storage structure, and at least on reorganization algorithm for storing correlated storage blocks in physical proximity to each other on the storage partition of the at least one storage structure, wherein the block reorganization operation is performed by the at least one data storage subsystem transparently to the operating system employing the at least one data storage subsystem; and
  update a virtual map to reflect the effects of the block reorganization operation, the virtual map configured to map a storage address space of the operating system with the one or more storage blocks of the at least one storage structure.

20. The system of claim 19, wherein the at least one data storage subsystem is further configured to monitor input/output (I/O) commands of the at least one host computer and record I/O data describing the I/O commands.

21. The system of claim 19, wherein the at least one storage structure is selected from the group consisting of a hard disk, an array of hard disks, total storage system, and a hierarchical storage system with redundant array of independent disks RAID.

22. A method for reorganizing a storage structure, the method comprising:
 a data storage subsystem that is separate from a host implementing an operating system using the data storage subsystem performing a block reorganization operation that shuffles on one or more storage blocks of the storage structure based on correlation data representing relationships between individual storage blocks of the storage structure, a block allocation scheme describing physical and logical attributes of the storage structure, and at least one reorganization algorithm for storing correlated storage blocks in physical proximity to each other on the storage partition of the storage structure, wherein the block reorganization operation is performed by the data storage subsystem transparently to the operating system employing the data storage subsystem; and
 the data storage subsystem updating a virtual map to reflect the effects of the block reorganization operation, the virtual map configured to map a host storage address space of the operating system with the one or more storage blocks of the storage structure.

* * * * *